Figure 8:
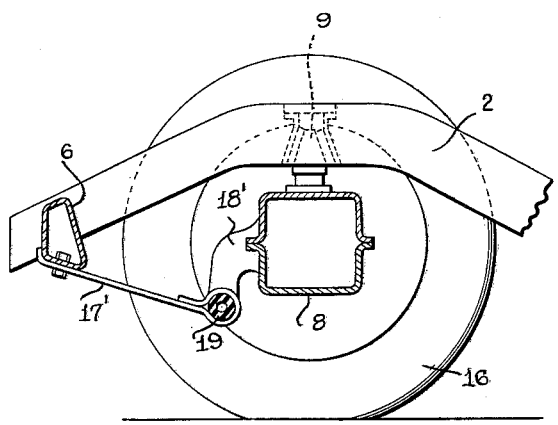

June 11, 1963　　A. FR. ROTHWEILER　　3,093,391
FRONT AXLE AUXILIARY FRAME SUSPENSION
Filed July 18, 1961　　2 Sheets-Sheet 1
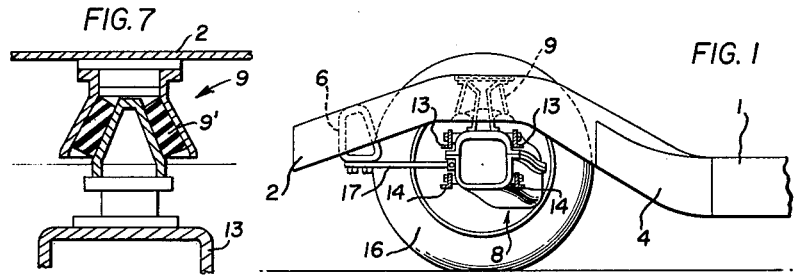
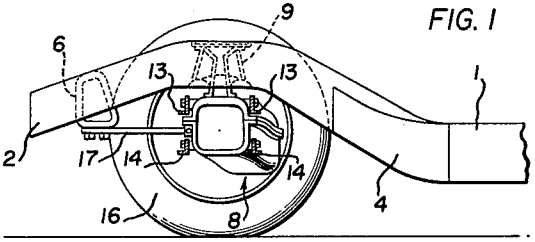
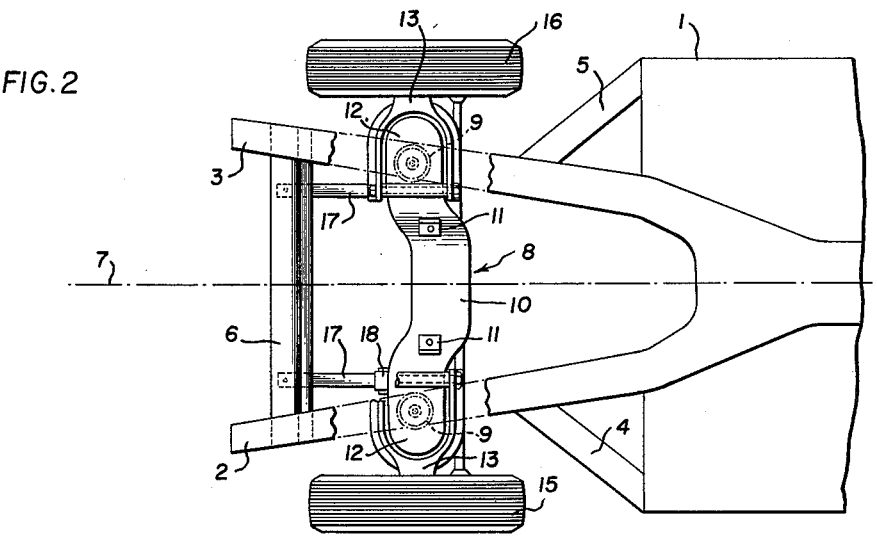
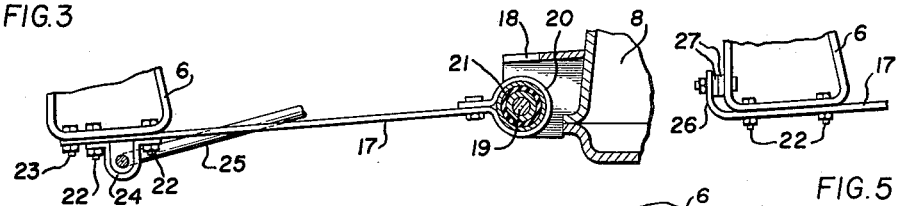
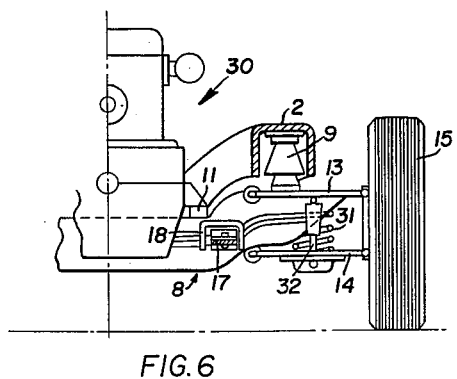
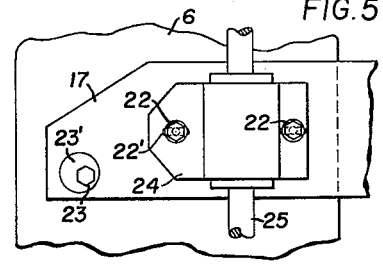
INVENTOR.
ALFRED FR. ROTHWEILER
BY
Dicke, Craig & Freudenberg
ATTORNEYS June 11, 1963   A. FR. ROTHWEILER   3,093,391
FRONT AXLE AUXILIARY FRAME SUSPENSION
Filed July 18, 1961   2 Sheets-Sheet 2

INVENTOR.
ALFRED FR. ROTHWEILER
BY
ATTORNEYS.

United States Patent Office 3,093,391
Patented June 11, 1963

3,093,391
FRONT AXLE AUXILIARY FRAME SUSPENSION
Alfred Fr. Rothweiler, Esslingen-Hegensberg, Germany, assignor to Daimler-Benz Aktiengesellschaft, Stuttgart-Unterturkheim, Germany
Filed July 18, 1961, Ser. No. 124,840
Claims priority, application Germany July 22, 1960
6 Claims. (Cl. 280—106.5)

The present invention is a continuation-in-part application of my copending application Serial No. 846,697, filed October 15, 1959, now abandoned and entitled "Auxiliary Frame Suspension."

The present invention relates to a securing arrangement and suspension of an auxiliary frame in motor vehicles in which an auxiliary frame, especially an auxiliary frame supporting thereon pivotally secured axle members of wheel suspension means, is elastically supported at the vehicle superstructure such as the main frame or body of a self-supporting type vehicle body and in which, in addition to the preferably very soft bearing elements transmitting the vehicle weight to the auxiliary frame, guide members are arranged between the auxiliary frame and the vehicle superstructure such as the main frame or the vehicle body which permit vertical relative movements of the auxiliary frame with respect to the vehicle superstructure while preventing essentially horizontal relative movements with respect thereto.

The present invention essentially consists in arranging guide members in the form of leaf springs which extend only in the vehicle longitudinal direction whereby an effective absorption of the braking and accelerating forces acting in the vehicle longitudinal direction as well as of the lateral forces which may additionally occur during operation of the vehicle is achieved in a simple manner and with few means by the same guide members.

According to a further feature of the present invention, one leaf spring each may be arranged on both sides of the center longitudinal axis of the vehicle as viewed in plan view thereof whereby the two leaf springs are spaced from each other a relatively large distance. With an auxiliary frame which is supported on both sides of a center longitudinal plane of the vehicle by means of one bearing element each with respect to the vehicle superstructure such as the main frame or vehicle body of a self-supporting type vehicle body, the connecting points of the leaf springs at the auxiliary frame, according to another feature of the present invention, may have a relatively large distance in the vertical direction from the bearing elements supporting the auxiliary frame at the vehicle superstructure such as the main frame or vehicle body so that moments which seek to rotate the auxiliary frame about a vehicle transverse axis may be absorbed in an advantageous manner.

Furthermore, the leaf springs may be pivotally connected at the auxiliary frame, preferably by the arrangement of inserts excluding metal-to-metal contact, for example, by the insertion of rubber bushings, about axes disposed transversely to the vehicle longitudinal direction, whereas, in contrast thereto, the leaf springs are rigidly secured at the vehicle superstructure such as the main frame or vehicle body, preferably at a vehicle frame cross member by any appropriate means such as a clamping means.

The connection or securing of the leaf springs at the vehicle superstructure such as the main frame or vehicle body of a self-supporting type may be constructed advantageously so as to be adjustable in the vehicle longitudinal direction in order to enable in this manner adjustment of the caster of the front axle or axle members. The adjustment in the vehicle longitudinal direction may take place by means of bolts provided with an eccentric portion extending through the leaf springs or also by the arrangement of inserts between the abutments formed by the leaf springs and the auxiliary frame.

The present invention also aims at a further improvement of the leaf spring guide means which essentially consists in disposing or arranging the place of connection of the support or guide members constructed as leaf springs with the vehicle superstructure, such as the auxiliary frame or vehicle body of a self-supporting type body construction, at a higher level than the place of connection thereof with the auxiliary frame.

By this latter arrangement, the leaf spring guide members are supported in a position in which they more favorably absorb the forces and moments coming from the vehicle wheels than when the support or guide members extend horizontally or upwardly at an incline in the direction toward the auxiliary frame. By the use of this latter arrangement, as disclosed herein, it is possible to increase the distance from the connecting places of the support or guide members at the auxiliary frame to the bearing places of the auxiliary frame at the vehicle superstructure whereby the rubber bearings utilized at these connecting places may also be constructed to be more yielding or flexible which enhances the absorption qualities thereof.

Accordingly, it is an object of the present invention to provide a suspension for an auxiliary frame from the vehicle superstructure of a motor vehicle which is simple in construction and effective to provide excellent static and dynamic conditions in the suspension.

Another object of the present invention is the provision of guide means for the suspension of an auxiliary frame from the vehicle superstructure such as the main frame or vehicle body of a self-supporting type vehicle body which permit vertical relative movements of the auxiliary frame with respect to the vehicle superstructure while preventing essentially horizontal movements therebetween so as to permit the use of relatively soft bearing elements between the auxiliary frame and the vehicle superstructure which normally transmit the vehicle weight to the auxiliary frame.

Another object of the present invention resides in the provision of guide means for the suspension of an auxilary frame from the vehicle superstructure, such as the main frame or vehicle body of a self-supporting type body which readily absorb the braking and accelerating forces acting in the vehicle longitudinal direction while also absorbing the lateral forces which occur during operation of the vehicle.

Still another object of the present invention resides in the provision of an auxiliary guide means in the form of longitudinal leaf springs which are effective to absorb any moments which tend to rotate the auxiliary frame about a vehicle transverse axis and which cannot be absorbed readily by the relatively soft elastic bearing elements normally supporting the vehicle superstructure on the auxiliary frame.

A further object of the present invention is the provision of guide means which enable an adjustment, by simple means, of the auxiliary frame with respect to the vehicle superstructure in the vehicle longitudinal direction to thereby adjust in a simple manner the caster of the wheel suspension.

These and other objects, features and advantages of the present invention will become more obvious from the following description when taken in connection with the accompanying drawing which shows, for purposes of illustration only, several embodiments in accordance with the present invention and wherein:

FIGURE 1 is a side-elevational view of an auxiliary frame operatively connected with the vehicle superstructure in accordance with the present invention, FIGURE 2 is a plan view of the suspension of the auxiliary frame on the vehicle superstructure in accordance with the present invention as illustrated in FIGURE 1, FIGURE 3 is a cross-sectional view, on an enlarged scale, of the connection of a leaf spring at the auxiliary frame and main frame as viewed from the side thereof, FIGURE 4 is a plan view of the connection of the leaf spring with the auxiliary frame and the main frame as illustrated in FIGURE 3, FIGURE 5 is a side-elevational view similar to FIGURE 3 showing a modified embodiment of a connection of the leaf spring at the main frame, FIGURE 6 is a partial front view of the vehicle illustrated in FIGURE 2, FIGURE 7 is a partial cross-sectional view of the elastic supporting means, and FIGURE 8 is a side-elevational view of a modified arrangement of the guide means of the present invention.

Referring now to the drawing wherein like reference numerals are used throughout the various views to designate corresponding parts, and more particularly to FIGURES 1 and 2 thereof, reference numeral 1 designates therein the main frame of a motor vehicle made essentially of pressed sheet metal parts which is forked in the direction of the drive of the vehicle and provided within the region of the front axle members with upwardly bent fork arms 2 and 3. The fork arms 2 and 3 of the main frame which are offset upwardly with respect to the plane of the main frame 1 are further reinforced by bracket-like struts 4 and 5, respectively. The two arm portions 2 and 3 of the main frame are rigidly connected with each other at the front end thereof by means of a transverse bearer member 6. The auxiliary frame generally designated by reference numeral 8 which is also constructed of pressed sheet metal parts extends transversely to the center longitudinal axis 7 of the vehicle extending through the main frame and is located below the arm portions 2 and 3 thereof. The auxiliary frame 8 is operatively connected with the fork-arm portions 2 and 3 of the main frame by means of bearing elements 9 which may be of any suitable construction to provide the desired yielding characteristics. Preferably rubber bushings or the like are used in the bearing supports 9 to produce these results. The auxiliary frame 8 is bent downwardly within the region 10 thereof disposed between the two bearing elements 9. As also clearly visible from FIGURE 2, the auxiliary frame 8 within the region 10 thereof, is not only offset in the downward direction but is also bent in the rearward direction thereof so as to have a double curvature within region 10 downwardly and rearwardly. The bearing elements 9 which consist preferably of rubber are arranged essentially within the profile of the arm portions 2 and 3, and are constructed of very soft or yielding material for elastically absorbing vertical forces. Rubber bearings 11 of any suitable construction serve for purposes of supporting the driving unit of the motor vehicle (not illustrated) on the auxiliary frame 8 which are arranged on the auxiliary frame 8 intermediate the two bearing elements 9 on both sides of the vehicle central longitudinal axis 7. The wheels 15 and 16 are suspended from the auxiliary frame 8 along the two outer ends 12 thereof by means of upper and lower transverse guide members 13 and 14 whereby a springy and vibration-absorbing support or suspension of the vehicle wheels 15 and 16 with respect to the auxiliary frame is achieved by the provision of springs 31, for example, coil springs, pneumatic springs or the like and shock absorbers 30, which are supported, on the one hand, against the lower transverse guide member 14 and, on the other, against the auxiliary frame 8, respectively.

Since the auxiliary frame 8 with the very soft bearing elements 9 has to absorb the braking and accelerating forces as well as the lateral forces, two leaf springs 17 are provided for supporting the auxiliary frame 8 against the main frame 1, 2, 3, 6. The leaf springs 17 extend essentially in the horizontal direction from the auxiliary frame 8 forwardly of the vehicle and are arranged on both sides of the center longitudinal axis 7 at a relatively large distance from each other. For purposes of securing the leaf springs 17 at the auxiliary frame 8, sheet metal bracket or support members 18 are arranged at the auxiliary frame 8 which, as clearly visible from FIGURES 3 and 4, carry the securing bolt members 19 extending transversely to the vehicle longitudinal direction. The leaf springs 17 surround the securing bolt members 19 with the eye portions 20 thereof by the interposition of rubber sleeves 21 in such a manner that the leaf springs 17 are pivotal with the spring eye portions 20 thereof about the longitudinal axis of the bolt members 19 which extend in the transverse direction of the vehicle. By the same token, however, movements of the auxiliary frame 8 in the direction of the longitudinal axes of the bolt members 19, i.e., in the vehicle's transverse direction, are precluded by this arrangement. The leaf springs 17 are connected with the main frame 1, 2, 3 of the vehicle through the transverse bearer member 6 at which the leaf springs 17 are secured by means of bolts 22 (FIGURES 3-5). The bolts 22 thereby extend through elongated apertures 22' provided in the leaf springs 17 in order to enable an adjustment of the auxiliary frame 8 by the displacement of the leaf springs 17 in the longitudinal direction thereof. The eccentric bolt members 23 contribute to an accurate adjustment of the longitudinal displacement of leaf springs 17. The eccentric bolt members are arranged in bores 23' through the leaf springs 17. A rotation of the eccentric bolt members 23 with simultaneously loosened bolts 22 is effective to cause a change in the effective length of the leaf springs 17. The bolts 22 serve in addition to fastening the leaf springs 17 for purposes of securing bearing brackets 24 in which the stabilizer rod 25 is supported.

In the embodiment according to FIGURE 5, the leaf spring 17 is provided with an upwardly bent abutment 26 of which the distance from the forward wall of the transverse bearer member 6 is adjustably constructed by means of spacer disks 27.

Referring now to FIGURE 8 of the drawing which illustrates a longitudinal cross sectional view through the front axle suspension of a motor vehicle in accordance with a modified arrangement of the leaf spring guide means of the present invention, like reference numerals are used to designate parts corresponding to the parts of FIGURE 1. Reference numeral 8 designates therein the auxiliary frame for the front axle suspension which is constructed as support or bearer member for the wheel suspension and the wheel spring system in the manner described above.

The main frame constituting the vehicle superstructure in the illustrated embodiment may also be constructed as described above. The auxiliary frame 8 is supported within the area of the upwardly bent portion 2 of the main frame by means of rubber bearings 9 of any suitable construction, as illustrated in detail in FIGURE 7. The elastic bearings are relatively very soft so as to readily transmit the weight of the vehicle to the auxiliary frame 8 and provide a relatively large yieldingness in the vertical direction.

The forwardly extending arm portions 2 of the main frame forming part of the vehicle superstructure are interconnected with each other by means of a transverse bearer member 6.

The auxiliary frame 8 is additionally guided by means of two longitudinally extending support or guide members 17' which are arranged symmetrically to the vehicle longitudinal center plane and are constructed in the form of leaf springs. The leaf springs 17' the lengths of which are adjustable by any suitable means such as illustrated in FIGURES 3, 4, and 5, for example, are suitably secured at the forward ends thereof to the frame cross bearer member 6.

The support or guide members 17' engage the auxiliary frame by means of securing bolt members 19 at the bearing brackets 18' rigidly connected with the auxiliary frame 8. The bolt members are illustrated in detail in FIGURE 3. The bearing brackets 18' have a first portion extending forwardly away from the auxiliary frame 8 and a second portion extending approximately in the downward direction to thereby effectively lower the position of the bolt members 19. The bolt members 19 which have transversely extending axes are such as to enable pivotal movement of guide members 17' about the transverse axes thereof while at the same time precluding movements of the auxiliary frame 8 in the transverse direction of the vehicle.

The connecting places of the support or guide members 17' with the vehicle superstructure such as with the main frame 2 or with the cross bearer member 6 thereof are thereby disposed higher above the road surface than the bolt members 19 of the support or guide members 17' with the auxiliary frame 8 so that the support or guide members 17' extend obliquely downwardly in a direction opposite to the normal driving direction of the vehicle. As a result of such an arrangement, there is achieved a large distance between the bolt members 19 and the rubber bearings 9 so that the forces and moments occurring during driving of the vehicle are absorbed more favorably by the auxiliary frame.

The term vehicle "superstructure" is used herein and in the following claims to designate the part of the vehicle such as the main frame of any suitable construction or those parts of a self-supporting type body construction which carry the weight of the vehicle.

While I have shown and described several embodiments in accordance with the present invention, it is understood that the same is not limited thereto but is susceptible of many changes and modifications within the spirit and scope of the present invention, and I, therefore, do not wish to be limited to the particular details shown and described herein, but intend to cover all such changes and modifications as are encompassed by the scope of the appended claims.

I claim:

1. An auxiliary frame suspension for a vehicle having a superstructure including a main frame and a plurality of wheels, comprising an auxiliary frame, independent wheel suspension means for suspending said wheels from said auxiliary frame, resilient support means for transmitting the vehicle weight from the superstructure to the auxiliary frame consisting of two relatively soft elastic bearing means secured between said main frame and said auxiliary frame and arranged on opposite sides of the vehicle central longitudinal plane, said bearing means being spaced from each other a relatively large distance in the transverse direction of the vehicle, and guide means operatively connecting said auxiliary frame to said vehicle superstructure to allow relative vertical movements of said auxiliary frame with respect to said vehicle superstructure while essentially preventing relative horizontal movements therebetween, said guide means comprising two leaf springs arranged on opposite sides of the central longitudinal plane of the vehicle and extending essentially in the vehicle longitudinal direction, elastic pivot means for securing one end of each of said leaf springs to said auxiliary frame so as to pivot about essentially transverse axes, and means for rigidly securing the other end of each of said leaf springs to said vehicle superstructure, said rigid securing means including means for adjusting the effective length of said leaf springs, said pivot means being spaced a relatively large distance in the vertical direction from said elastic bearing means, said first-mentioned distance being greater than said last-mentioned distance.

2. An arrangement as defined in claim 1, wherein said elastic pivot means includes elastic bearing members preventing metal-to-metal contact, and wherein said means for adjusting the effective length of said leaf springs includes bolt means provided with an eccentric portion extending through said leaf springs and elongated apertures in said leaf springs.

3. An arrangement according to claim 1, wherein said means for adjusting the effective length of said leaf springs includes an abutment formed by said leaf springs and interchangeable spacer means adapted to be inserted between said abutment and said vehicle superstructure.

4. An arrangement according to claim 1, wherein said leaf springs extend essentially horizontally with respect to the road surface.

5. An arrangement according to claim 1, wherein said leaf springs extend at an angle with respect to the road surface from said vehicle superstructure downwardly to said auxiliary frame, said elastic pivot means being arranged in a plane spaced a distance below the plane containing said means for securing each of said leaf springs to said vehicle superstructure.

6. An auxiliary frame for the front axle suspension of motor vehicles having a superstructure including a main frame and a plurality of wheels, comprising auxiliary frame means, elastic connecting means elastically connecting said auxiliary frame means at said vehicle superstructure in only two places arranged on opposite sides of the vehicle longitudinal center plane and at a distance therefrom, wheel suspension means for spring-suspending said wheels from said auxiliary frame means, and guide means operatively connecting said auxiliary frame means at said vehicle superstructure to enable relative vertical movements of said auxiliary frame means with respect to the vehicle superstructure while substantially preventing relative horizontal movements therebetween, said guide means comprising two leaf springs extending essentially in the vehicle longitudinal direction and substantially symmetrically arranged with respect to the vehicle center longitudinal plane, means for enabling adjustment of the effective lengths of said springs, first connecting means operatively connecting the forwardly extending end of each said spring to said vehicle superstructure in a substantially non-elastic manner, and second connecting means operatively connecting the rearwardly extending ends of each said spring with said auxiliary frame means, said first connecting means being disposed at a higher level with respect to the roadway than said second connecting means so that said leaf springs extend downwardly from said superstructure in the direction toward said auxiliary frame means, and said second connecting means including downwardly extending bracket-like support means secured to said auxiliary frame means, and pivotal connecting means having a substantially transversely extending axis and being provided with means preventing metal-to-metal contact for pivotally and elastically securing the rearwardly disposed ends of each said spring to said bracket-like support means, said pivot means being arranged in a horizontal plane spaced a relatively large distance in the vertical direction below the horizontal plane containing said elastic bearing means and from the horizontal plane containing said rigid securing means.

References Cited in the file of this patent

UNITED STATES PATENTS

| | | |
|---|---|---|
| 792,777 | Kenehan | June 20, 1905 |
| 1,461,497 | Robbins | July 10, 1923 |
| 1,726,189 | Moir | Aug. 27, 1929 |
| 1,881,408 | Le Moon | Oct. 4, 1932 |
| 2,751,992 | Nallinger | June 26, 1956 |
| 2,868,538 | Schow | Jan. 13, 1959 |
| 2,869,891 | Venditty | Jan. 20, 1959 |
| 3,024,040 | Muller | Mar. 6, 1962 |